United States Patent [19]

Takami et al.

[11] 4,311,907
[45] Jan. 19, 1982

[54] RADIATION DETECTOR HAVING REFRACTIVE INDEX MATCHING MEANS

[75] Inventors: Katsumi Takami, Tokyo; Yoshitoshi Ito, Ohme; Kenji Ishimatsu, Abiko; Eiichi Tanaka, Mitaka, all of Japan

[73] Assignees: Hitachi Medical Corporation, Tokyo; National Institute of Radiological Sciences, Chiba, both of Japan

[21] Appl. No.: 134,283

[22] Filed: Mar. 26, 1980

[30] Foreign Application Priority Data

Mar. 30, 1979 [JP] Japan .................................. 54-38102

[51] Int. Cl.³ .............................................. G01T 1/20
[52] U.S. Cl. ...................................... 250/368; 250/487
[58] Field of Search .................... 250/361 R, 368, 487

[56] References Cited

U.S. PATENT DOCUMENTS 4,143,271  3/1979  Klein et al. .......................... 250/368
4,158,773  6/1979  Novak ............................... 250/368 X

*Primary Examiner*—Davis L. Willis
*Attorney, Agent, or Firm*—Craig and Antonelli

[57] ABSTRACT

In a radiation detector including a radiation sensitive scintillator and a photo-electric conversion element, a film of silicon nitride providing a modified refractive index is interposed between the scintillator and the photo-electric conversion element.

8 Claims, 10 Drawing Figures

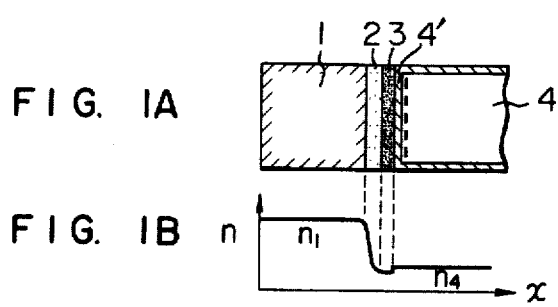
FIG. 1A
FIG. 1B
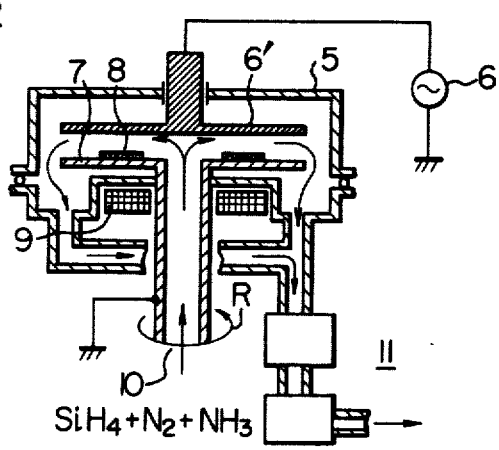
FIG. 2
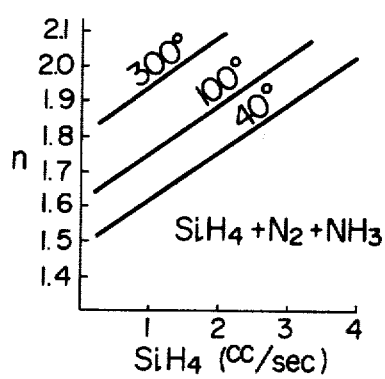
FIG. 3
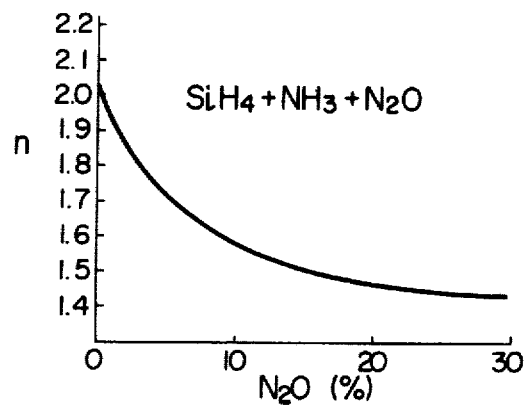
FIG. 4

FIG. 5
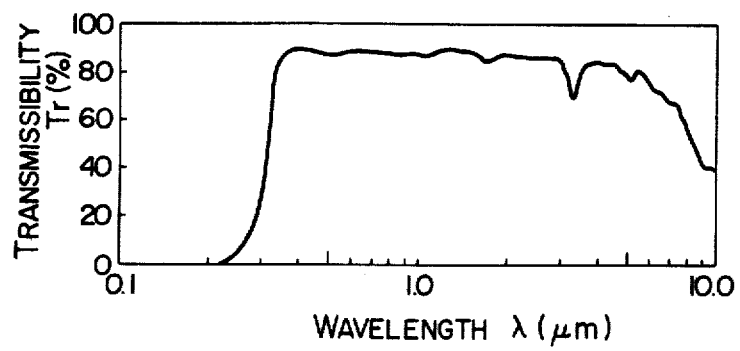
FIG. 6A
FIG. 6B
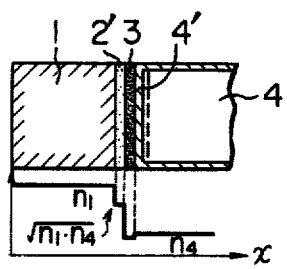
FIG. 7A
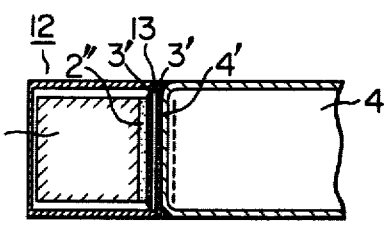
FIG. 7B
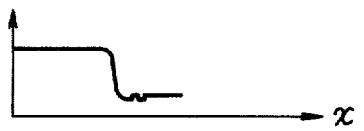

RADIATION DETECTOR HAVING REFRACTIVE INDEX MATCHING MEANS

The present invention relates to a radiation detector, and more particularly to a radiation detector which is high in efficiency of light propagation.

In general, an inorganic scintillator made of such a material as NaI (Tl), CsI (Tl), CsI (Na), $CdWO_4$, or $Bi_4Ge_3O_{12}$ has a high refractive index. For example, the refractive indices of NaI (Tl) and $Bi_4Ge_3O_{12}$ are nearly equal to 1.85 and 2.15 respectively, in a luminous wavelength range (namely, a wavelength range of the fluorescent light emitted). Light generated in a crystal having such a high refractive index can emerge from the crystal when the generated light impinges upon the crystal surface at an angle smaller than a certain critical angle, though there is some reflection loss. On the other hand, the light arriving at the crystal surface at an angle greater than the critical angle is totally reflected back into the crystal, and such total internal reflection is conducted infinite times so that the light is dissipated as heat. Further, the greater the refractive index of the crystal, the smaller the critical angle becomes, thereby decreasing the amount of light sent from the crystal to a photo-electric conversion element.

In order to overcome the above problem, it has been proposed and put into practical use that the crystal surface is coarsely polished to effectively enlarge the critical angle and the coarsely polished surface is coupled with the photo-electric conversion element. However, a light loss due to the absorption of light or the diffused reflection of light takes place at the coarsely polished surface.

An object of the present invention is to provide a radiation detector in which the efficiency of light propagation between a scintillator and a photo-electric conversion element is greatly improved.

According to the present invention, there is provided a radiation detector comprising a scintillator means sensitive to radiation thereon for providing luminescent light therefrom and a photo-electric conversion means for converting the luminescent light from the scintillator means into an electric signal, wherein a substance for changing the refractive index of said luminescent light is interposed in an optical path between said scintillator means and said photo-electric conversion means.

The present invention will be described in detail in conjunction with the accompanying drawings, in which:

FIG. 1A shows in cross section the construction of a radiation detector according to one embodiment of the present invention;

FIG. 1B is a graph showing a distribution of refractive index in the embodiment shown in FIG. 1A;

FIG. 2 shows in cross section an apparatus for depositing a silicon nitride film used in the present invention;

FIGS. 3 and 4 are graphs each showing the dependence of refractive index of the silicon nitride film on film depositing conditions;

FIG. 5 is a graph showing a spectral transmissibility of the silicon nitride film;

FIG. 6A shows in cross section the structure of a radiation detector according to another embodiment of the present invention;

FIG. 6B is a graph showing a distribution of refractive index in the embodiment shown in FIG. 6A;

FIG. 7A shows in cross section the structure of a radiation detector according to a further embodiment of the present invention; and FIG. 7B is a graph showing a distribution of refractive index in the embodiment shown in FIG. 7A.

In FIG. 1A showing a radiation detector according to one embodiment of the present invention, reference numeral 1 designates a radiation sensitive scintillator having a high refractive index, 2 designates a silicon nitride film as refractive index matching means deposited through plasma glow discharge, 3 designates an adhesive film which may be made of silicon oil or silicon grease, and 4 designates a photomultiplier having its face plate 4'. FIG. 1B shows a graph for explaining the refractive index matching according to the one embodiment of the present invention, the abscissa and ordinate indicating distance x and refractive index n respectively.

In the case when the refractive indices of the scintillator 1 and face plate 4' are $n_1$ and $n_4$ respectively, the refractive index of luminescent light from the scintillator 1 is continuously changed from $n_1$ to $n_4$ by use of the silicon nitride film 2, as shown in FIG. 1B and as will be explained later in detail.

When such an optical film for refractive index matching is used, the light propagating from the scintillator 1 to the face plate 4' in a direction perpendicular to the face plate 4' has a smaller reflection loss due to the absence of an abrupt change in refractive index, as compared with the case where a stepwise abrupt change of refractive index takes place. Thus, the efficiency of light propagation can be improved.

The critical angle α is given by the following equation:

$$\sin \alpha = n_4/n_1$$

that is, the critical angle α is independent of the refractive index of the intermediate film. Accordingly, the critical angle is not affected by the continuous change of refractive index in the intermediate film. Also for the light obliquely incident upon the face at an angle smaller than the critical angle, its reflection loss is small and hence its propagation efficiency is effectively improved, as compared with the case where the stepwise abrupt change of refractive index takes place. In this way, when the refractive index is changed continuously (or the change of the differential coefficient of the refractive index is smooth), the light propagation characteristic is improved as a whole.

Now, explanation will be made of means for continuously changing the refractive index.

When a silicon nitride film is formed on a substrate through vapor deposition, the substrate must be usually heated to temperatures of a range from 900° to 1200° C. If a scintillator is heated to such a high temperature to form the silicon nitride film thereon, the scintillator formed of a crystal having a low melting point is melted, which renders the intended deposition impossible. The scintillator formed of a crystal having a high melting point may be subjected to internal strain at heating and cooling processes, thereby deteriorating the quality of the scintillator. Therefore, the deposition of a silicon nitride film is effected through plasma glow discharge, in accordance with the present invention, in order to avoid high temperature heating. In FIG. 2 showing an apparatus for carrying out such a deposition, reference numeral 5 designates a reaction vessel, 6 designates a high frequency (0.5–30 MHz) power supply, 6' designates an electrode, 7 designates a grounded electrode which is rotated in a direction indicated by arrow R, 8 designates a scintillator, 9 designates a heater for controlling the temperature of the scintillator 8, 10 designates an inlet for introducing a mixture gas containing $SiH_4$, $N_2$ and $NH_3$, and 11 designates a vacuum pump which can provide a reduced pressure of 0.05 to 1 Torr.

With the above apparatus, when high frequency gloe discharge (or plasma glow discharge) in order of about 10 watts is conducted under vacuum to deposit a silicon nitride film on the surface of the scintillator, the refractive index of the deposited film can be freely controlled depending upon the flow rate of $SiH_4$ and/or the temperature of the scintillator (which is kept at a controlled temperature within 40° to 400° C.). FIG. 3 shows the results of experiments. From FIG. 3, it can be understood that for example, when the flow rate of $SiH_4$ is set to 0.5 cc sec and the temperature of the scintillator is gradually decreased from 300° C. to 40° C., the deposited silicon nitride film has its refractive index which is continuously changed from about 1.9 to 1.55. Thus, there can be formed the silicon nitride film having its refractive index which is continuously changed over the thickness.

It has been found that such a controlled film may be also obtained when a mixture gas containing is introduced in the apparatus shown in FIG. 2 while changing the concentration of $N_2O$ in the mixture gas, as shown in FIG. 4.

Further, it has been experimentally confirmed that the silicon nitride film formed as above has a spectral transmissibility of about 90% over a wavelength range from near ultraviolet region to near infrared region, as shown in FIG. 5.

Since the silicon nitride film is deposited through the plasma glow discharge method, the temperature of the scintillator can be maintained below 400° C. Accordingly, the scintillator is not subjected to internal strain and hence the deterioration of quality. In addition, the refractive index of the silicon nitride film can be continuously controlled by continuously changing the film forming conditions to provide an optimum film for refractive index matching.

FIG. 6A shows the structure of a radiation detector according to another embodiment of the present invention. In this embodiment, the refractive index of the silicon nitride film is not continuously changed, but the film has a specified thickness and a specified refractive index which are selected to provide the minimum light reflection on the basis of the interference effect. In general, when an optical material having a refractive index of $n_1$ is combined with another optical material having a refractive index of $n_4$, the minimum light reflection is provided if between these optical materials is interposed a thin film having a refractive index $\sqrt{n_1 n_4} = n_1 n_4$ and a thickness d satisfying $n_{12}d = (2m+1)\lambda/4$, $\lambda$ and m indicating the wavelength of light and a positive integer respectively. In fact, however, an optical substance having a refractive index $n_{12}$ exactly satisfying the condition $\sqrt{n_{12} n_1 n_4}$ is not conventionally available. Accordingly, even if the exactly controlled thickness d of the film has been obtained, the refractive index of the resultant film is obliged to be deviated from a theoretical value. In the embodiment shown in FIG. 6A, a silicon nitride film 2' is deposited on the scintillator 1 through plasma glow discharge so as to provide its refractive index equal to $\sqrt{n_1 n_4}$ as shown in FIG. 6B. Further, the thickness d of the film 2' is made nearly equal to the above-mentioned theoretical value by appropriately selecting the film depositing conditions in the reaction vessel.

By thus providing a strictly established refractive index unavailable from conventional optical substances, an ideal optical coupling condition can be attained between the scintillator and the photomultiplier and therefore the efficiency of light propagation can greatly be improved.

The present invention is applicable to the case where the scintillator is accomodated within a casing. Referring to FIG. 7A, the scintillator 1 is placed in a casing 12 having a glass window 13. A silicon nitride film 2" is provided between the scintillator 1 and the glass window 13 of the casing 12. An adhesive film 3' is interposed between the silicon nitride film 2" and the glass window 13, and between the glass window 13 and the face plate 4' of the photomultiplier 4. FIG. 7B shows a distribution of refractive index in the structure shown in FIG. 7A.

As has been explained hereinbefore, according to the present invention, refractive index matching means is provided in an optical path between a scintillator sensitive to radiation thereto for producing luminescent light therefrom and a photomultiplier for receiving the luminescent light and photo-electric conversion.

In the foregoing description, the photomultiplier has been employed as photo-electric conversion means. However, the present invention is also applicable to the case where any other photo-electric conversion element such as a semiconductor photo-electric conversion element (for example, a photodiode) is combined with a scintillator.

The above embodiments have been described with respect to the deposition of a silicon nitride film as the refractive index matching film. It has been found that a film of $SiO_2$ or SiO formed on the scintillator through CVD (Chemical Vapor Deposition) process under plasma glow discharge may be equivalently used as the refractive index matching film. In that case, a mixture gas of $SiH_4$ and $N_2O$ is used while controlling the flow rate of $SiH_4$ or $N_2O$. The deposited $SiO_2$ film usually exhibits a refractive index of 1.9–1.6.

What is claimed is:

1. A radiation detector comprising a scintillator means sensitive to radiation thereon for providing luminescent light therefrom and a photo-electric conversion means for converting the luminescent light from the scintillator means into an electric signal, wherein silicon nitride for changing the refractive index of said luminescent light is interposed in an optical path between said scintillator means and said photo-electric conversion means.

2. A radiation detector according to claim 1, wherein said silicon nitride has a refractive index which is continuously changed therein.

3. A radiation detector according to claim 1, wherein said silicon nitride has a predetermined refractive index.

4. A radiation detector according to claim 1, wherein said silicon nitride is formed on said scintillator means through plasma glow discharge.

5. A radiation detector comprising a scintillator means sensitive to radiation thereon for providing luminescent light therefrom and a photo-electric conversion means for converting the luminescent light from the scintillator means into an electric signal, wherein a substance comprising a film of silicon nitride for changing the refractive index of said luminescent light is interposed in an optical path between said scintillator means and said photo-electric conversion means.

6. A radiation detector according to claim 5, wherein said silicon nitride film has its refractive index which is continuously changed in the film.

7. A radiation detector according to claim 5, wherein said silicon nitride film has a predetermined refractive index.

8. A radiation detector according to claim 5, wherein said silicon nitride film is a film formed on said scintillator means through plasma glow discharge.

* * * * *